(12) United States Patent
Mokhnatyuk (10) Patent No.: US 8,994,877 B2
(45) Date of Patent: Mar. 31, 2015

(54) METHOD AND SYSTEM FOR SYNCHRONIZING A FLASH TO AN IMAGER

(75) Inventor: Alexander Mokhnatyuk, Santa Clara, CA (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 1077 days.

(21) Appl. No.: 12/182,375

(22) Filed: Jul. 30, 2008

(65) Prior Publication Data

US 2010/0026853 A1     Feb. 4, 2010

(51) Int. Cl.
| | |
|---|---|
| *H04N 5/222* | (2006.01) |
| *H04N 5/262* | (2006.01) |
| *H04N 5/353* | (2011.01) |
| *H04N 5/232* | (2006.01) |
| *H04N 5/235* | (2006.01) |

(52) U.S. Cl.
CPC ......... *H04N 5/3532* (2013.01); *H04N 5/23296* (2013.01); *H04N 5/2354* (2013.01); *H04N 5/2628* (2013.01)
USPC ........................................ 348/371; 348/240.2

(58) Field of Classification Search
None
See application file for complete search history.

(56) References Cited

U.S. PATENT DOCUMENTS

| | | | |
|---|---|---|---|
| 3,800,562 | A | 4/1974 | Castagna |
| 4,286,849 | A | 9/1981 | Uchidoi et al. |
| 5,307,167 | A | 4/1994 | Park et al. |
| 5,666,160 | A | 9/1997 | Hwang |
| 5,739,867 | A | 4/1998 | Eglit |
| 6,167,202 | A * | 12/2000 | Fukui ............................ 396/157 |
| 6,327,440 | B1 | 12/2001 | Taniguchi et al. |
| 6,456,797 | B1 | 9/2002 | Boyd et al. |
| 6,459,428 | B1 | 10/2002 | Burk et al. |
| 6,587,117 | B1 | 7/2003 | Wright et al. |
| 6,727,908 | B1 | 4/2004 | Wright et al. |
| 6,765,578 | B2 | 7/2004 | Slavin |
| 6,826,364 | B2 | 11/2004 | Kawasaki et al. |
| 7,043,156 | B2 | 5/2006 | Tsuchida et al. |
| 7,050,649 | B2 | 5/2006 | Slavin |
| 7,084,914 | B2 | 8/2006 | Van Blerkom |
| 7,142,234 | B2 | 11/2006 | Kaplinsky et al. |
| 7,242,429 | B1 * | 7/2007 | Lee et al. ..................... 348/308 |

(Continued)

FOREIGN PATENT DOCUMENTS

WO     WO 2006/058053 A2     6/2006

OTHER PUBLICATIONS

Stan Sholik, "First Exposure: Hasselblad H1", Rangefinder Magazine, Jun. 2004, pp. 1-4.

(Continued)

*Primary Examiner* — Jason Flohre
(74) *Attorney, Agent, or Firm* — Michael H. Lyons (57) ABSTRACT

A digital camera system synchronizes a flash to an array of image sensing elements. The array of image sensing elements senses an image focused on the array by a lens. The system includes an array controller that implements an electronic rolling shutter to capture the image as a frame. The electronic rolling shutter includes read and reset pointers that the array controller scans through the array to capture integrated photo charges on the image sensing elements to generate the frame. The number of lines between the reset and read pointers defines the integration time of the imager. The system also includes a flash controller that synchronizes the flash to a portion of the frame. When the flash is activated, the camera system reduces the integration time and synchronizes the flash to the scanning of a selected portion of the array.

19 Claims, 7 Drawing Sheets

(56) References Cited

U.S. PATENT DOCUMENTS

| | | | |
|---|---|---|---|
| 7,283,663 B2 | 10/2007 | Sobel et al. | |
| 7,683,958 B1* | 3/2010 | Chen et al. | 348/333.01 |
| 2001/0010561 A1* | 8/2001 | Nagai | 348/371 |
| 2002/0154912 A1* | 10/2002 | Koseki et al. | 396/429 |
| 2003/0007088 A1* | 1/2003 | Rantanen et al. | 348/371 |
| 2003/0122946 A1* | 7/2003 | Nishino et al. | 348/297 |
| 2005/0178950 A1* | 8/2005 | Yoshida | 250/208.1 |
| 2006/0140615 A1 | 6/2006 | Suzuki | |
| 2006/0215924 A1* | 9/2006 | Steinberg et al. | 382/254 |
| 2007/0092235 A1 | 4/2007 | Misawa | |
| 2009/0046176 A1* | 2/2009 | Tabei | 348/240.99 |

OTHER PUBLICATIONS

Focus and recompose (PhotoNotes.org-Dictionary—F).
Andrzej Wrotniak, "Phototidbits: How does your focal plane shutter work?", Back to the Nitty-Gritty section, with articles on technical aspects of photography, 2007, pp. 1-8.

* cited by examiner

METHOD AND SYSTEM FOR SYNCHRONIZING A FLASH TO AN IMAGER

BACKGROUND OF THE INVENTION

In many modern CMOS imagers employing pixel arrays, image sensing/frame capturing is performed using a method known as "electronic rolling shutter" (herein "ERS"). This approach utilizes at least two pointers, Reset and Read, that are continuously scanned through the pixel arrays from top to bottom, jumping from line to line at line-time intervals.

Figure 1:
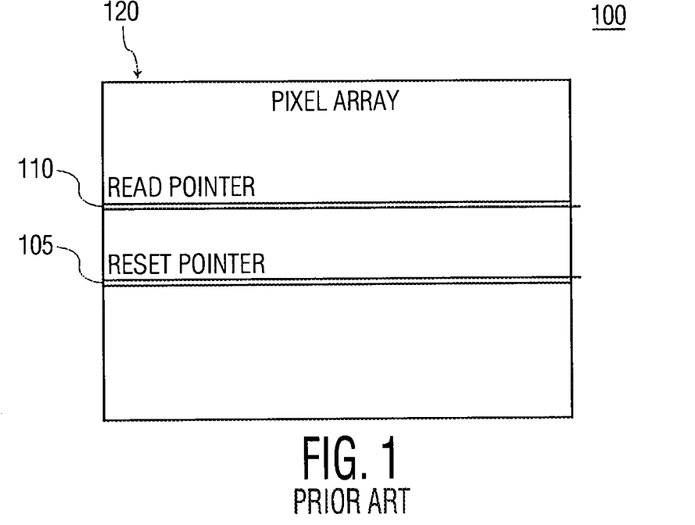
FIG. 1 illustrates a prior-art electronic rolling shutter for resetting and reading lines of pixels in a pixel array.

Referring to FIG. 1, there is illustrated a prior-art ERS 100 that comprises a Reset pointer 105 and a Read pointer 110 which are used respectively to reset and read out a pixel array 120. As Reset pointer 105 is scanned through pixel array 120, it resets the pixels in each line and, therefore, starts the integration of photo-charges for the pixels in the line. Some interval of time later (referred to as an "integration time" or an "optical integration time"), Read pointer 110, which is scanned synchronously with the reset pointer, reaches the lines reset by Reset pointer 105 and initiates signal readout. The distance in lines between the two pointers is referred to as "shutter width," and the amount of time the pointers point to a particular line in pixel array 120 is referred to as "line-time." Shutter width multiplied by the line-time equals the optical integration time for pixels in pixel array 120. The total time a pointer takes to scan a frame is referred to as "frame time." Frame time approximately equals the line-time multiplied by the number of lines in pixel array 120.

Figure 2:
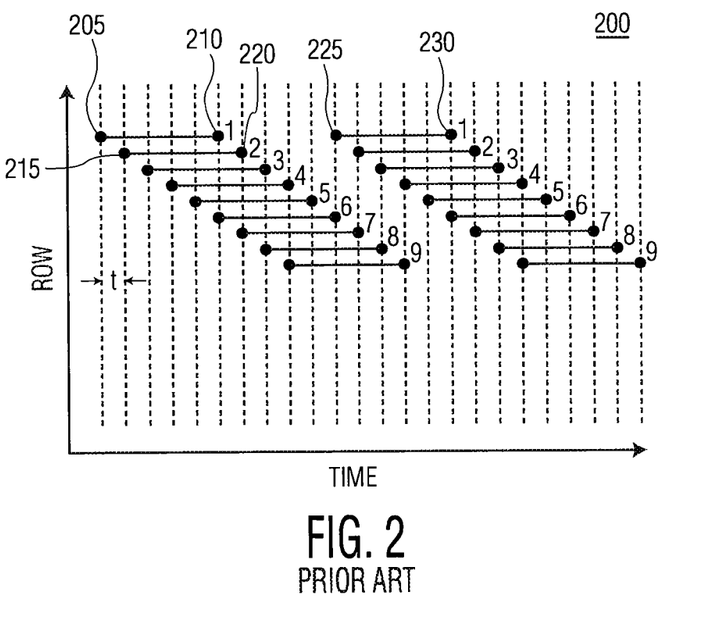
FIG. 2 illustrates a prior-art timing diagram for the electronic rolling shutter illustrated in FIG. 1.

Referring now to FIG. 2, there is illustrated a prior-art timing diagram 200 for ERS 100. For convenience, the example timing diagram 200 illustrated in FIG. 2 assumes that pixel array 120 includes nine lines (rows) of pixels. It is understood, however, that a typical pixel array 120 may comprise many more lines.

Timing diagram 200 illustrates the timing of read and reset for each line of pixel array 120. As illustrated, line 1 is reset at time 205 and read at time 210; line 2 is reset at time 215 and read at time 220; etc. Time 205 and time 215 are offset from one another by time t, which is approximately equal to the line-times for each of lines 1-9 illustrated in FIG. 2. Thus, line 2 is reset after time t elapses from the reset of line 1; line 3 is reset after time t elapses from the reset of line 2; etc. The read times of line 1-9 are also sequentially offset from one another by time t. The integration time for each of lines 1-9 approximately equals 5 t.

After line 9 is reset, ERS 100 returns to line 1 and resets it again, at time 225. ERS 100 reads row 1 again at time 230. Resetting and reading of lines 1-9 repeats using the technique described above so that the reading and resetting repeatedly rolls through lines 1-9. Hence, shutter 100 is an electronic rolling shutter.

As described above, electronic rolling shutter 100 allows for equal optical integration times for all pixels in pixel array 120. Optical integration for all pixels, however, does not happen simultaneously. Rather, because electronic shutter 100 "rolls" through pixel array 120, the actual time intervals over which pixels are integrated depend on the vertical positions of the pixels, i.e., their line numbers, in pixel array 120.

Prior-art flash techniques for using a flash to illuminate scenes captured by a pixel synchronize the flash pulse to an ERS using one of two methods: first curtain synchronization (also called "leading curtain synchronization") and last curtain synchronization (also called "trailing curtain synchronization"). Applications typically include digital still cameras and mobile cameras.

For leading curtain synchronization, a flash occurs before frame reading begins, i.e., before a Read pointer of an ERS reaches the beginning of the frame. For trailing curtain synchronization, the flash occurs after the last row of the frame is reset, i.e., after a Reset pointer of the ERS reaches the end of the frame.

BRIEF DESCRIPTION OF THE DRAWINGS

The invention is best understood from the following detailed description when read in connection with the accompanying drawings, with like elements having the same reference numerals. Included in the drawings are the following figures.

DETAILED DESCRIPTION OF THE INVENTION

When taking images of bright scenes, the integration time of an electronic imager may be set to be smaller than its frame time to prevent overexposure of the captured image. When a flash, such as an Xe, LED, or other type of pulsed flash, is used, flash scene brightness increases and the captured image or portions thereof could be overexposed. To prevent overexposure, the integration time of the electronic imager may be reduced. The frame time for the imager that captures the image does not change as frame time depends on a frame size pixel clock and also a mode of operation of the electronic imager; it does not depend on scene brightness. Thus, bright scenes may require smaller integration times than darker scenes, while frame time may remain unchanged.

Figure 3:
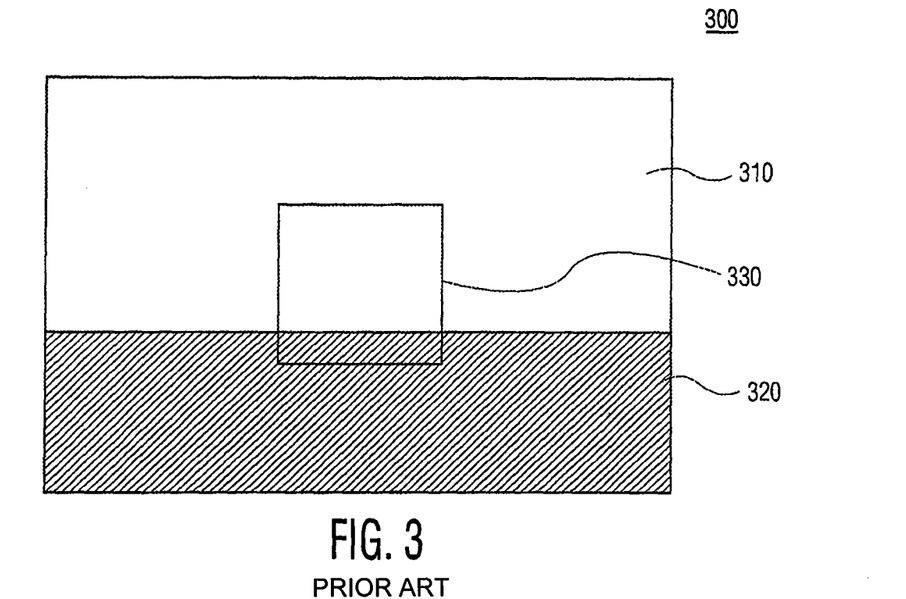
FIG. 3 illustrates a result of a method for synchronizing a flash to a leading curtain of a frame.

FIG. 3 illustrates a frame 300 for which a flash (not illustrated) is synchronized to the leading curtain of the frame. When the integration time of the imager that captures an image as frame 300 is smaller than its frame time, as is the case in FIG. 3, there are lines or pixels of the imager, and hence portions of frame 300, that are not exposed by the flash during their integration times. Portion 310 of frame 300 corresponds to an area of the imager that is exposed to the flash and ambient light during its integration period, and portion 320 corresponds to an area exposed to ambient light only (no flash) during its integration period. (The combination of portions 310 and 320 corresponds to the total number of lines or pixels of the electronic imager that generates frame 300.) Thus, portion 320 is underexposed, and parts of an object of interest, such as an object 330, within frame 300 are underexposed. Such a result may not be acceptable in certain imaging applications.

Figure 4:
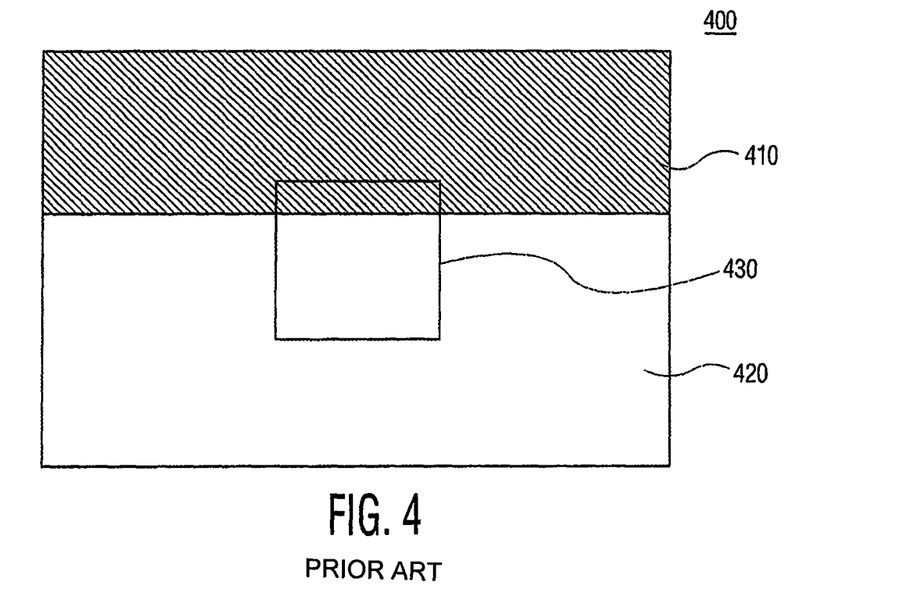
FIG. 4 illustrates a result of a method for synchronizing a flash to a trailing curtain of a frame.

Referring now to FIG. 4, there is illustrated a frame 400 for which a flash (not illustrated) is synchronized to the trailing curtain of the frame. Again, not all lines or pixels are illuminated by the flash during their integration times. The result is that a portion 420 of frame 400 is illuminated by the flash and ambient light while a portion 410 is illuminated by ambient light only (no flash). (The combination of portions 410 and 420 corresponds to the total number of lines or pixels of the electronic imager that generates frame 400.) Additionally, an object of interest, such as an object 430, within frame 400 may not be entirely exposed by the flash. Again, such a result may not be acceptable in certain imaging applications.

Figure 5:
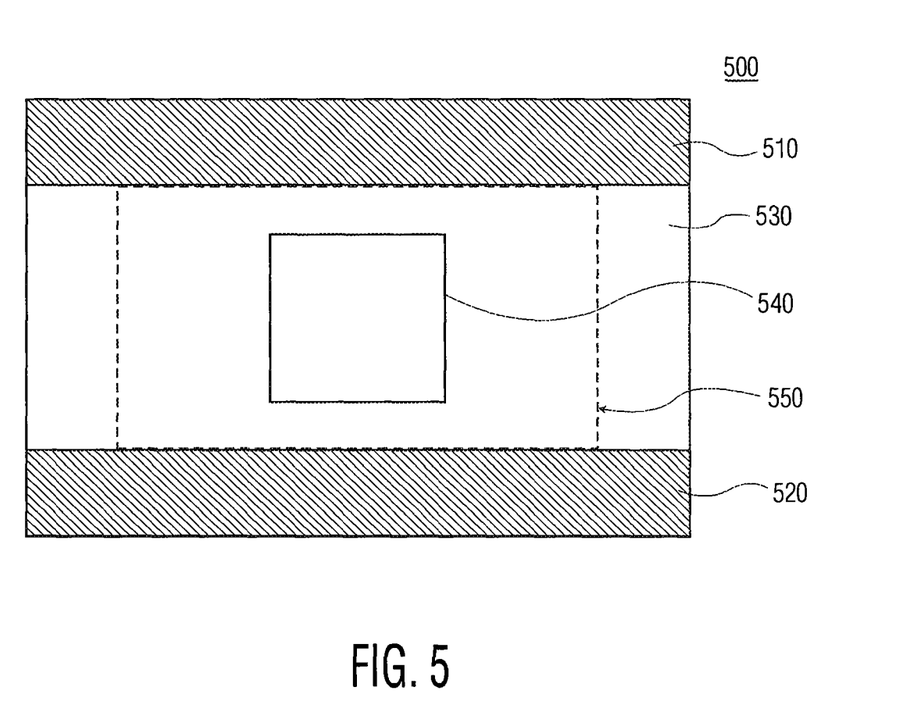
FIG. 5 illustrates a result of a method for synchronizing a flash to a middle portion of a frame, in accordance with an embodiment of the present invention.

FIG. 5 shows a frame 500 generated from an image captured by an imager (not illustrated) in accordance with an example embodiment of the present invention. Generally, frame 500 illustrates the results of a synchronization technique by which a flash is synchronized to a middle portion of the frame. This technique is referred to herein as "middle curtain synchronization."

Frame 500 includes portions 510 and 520 corresponding to respective portions of the image not illuminated by the flash. These corresponding portions of the imager were exposed to only ambient light during their respective integration periods. Hence, in certain lighting conditions that require flash, portions 510 and 520 of frame 500 are underexposed. A portion 530 of frame 500 and an object of interest 540 located within portion 530, however, are properly exposed (illuminated) by both flash and ambient light.

Portion 530 is in the middle of frame 500. Thus, portions 510 and 520 are approximately equal in size. Portion 530 is referred to herein as the "middle" or "central" portion 530. Although portions 510 and 520 are underexposed, a properly exposed portion 530, or a part 550 thereof, may be isolated, for example, utilizing a digital zoom feature to expand the isolated portion or a part thereof to a full frame, and a new frame may be presented entirely illuminated by the flash. Techniques for performing digital zoom are described below.

Generally, users of digital cameras direct the center of the viewfinders of such cameras on top of objects of interest so that the objects of interest are captured in the center of the captured images. For the reasons described above, existing camera systems may fail to properly expose all of the objects of interest, thereby resulting in the example exposure patterns of the frames illustrated in FIGS. 3 and 4. By synchronizing flash to a middle portion of a frame, such as in the example exposure pattern of frame 500 illustrated in FIG. 5, the methods and systems described herein provide the proper illumination of objects located in the center portions of captured images. Thus, the exposure pattern illustrated in FIG. 5 may be more desirable that those illustrated in FIGS. 3 and 4.

Figure 6:
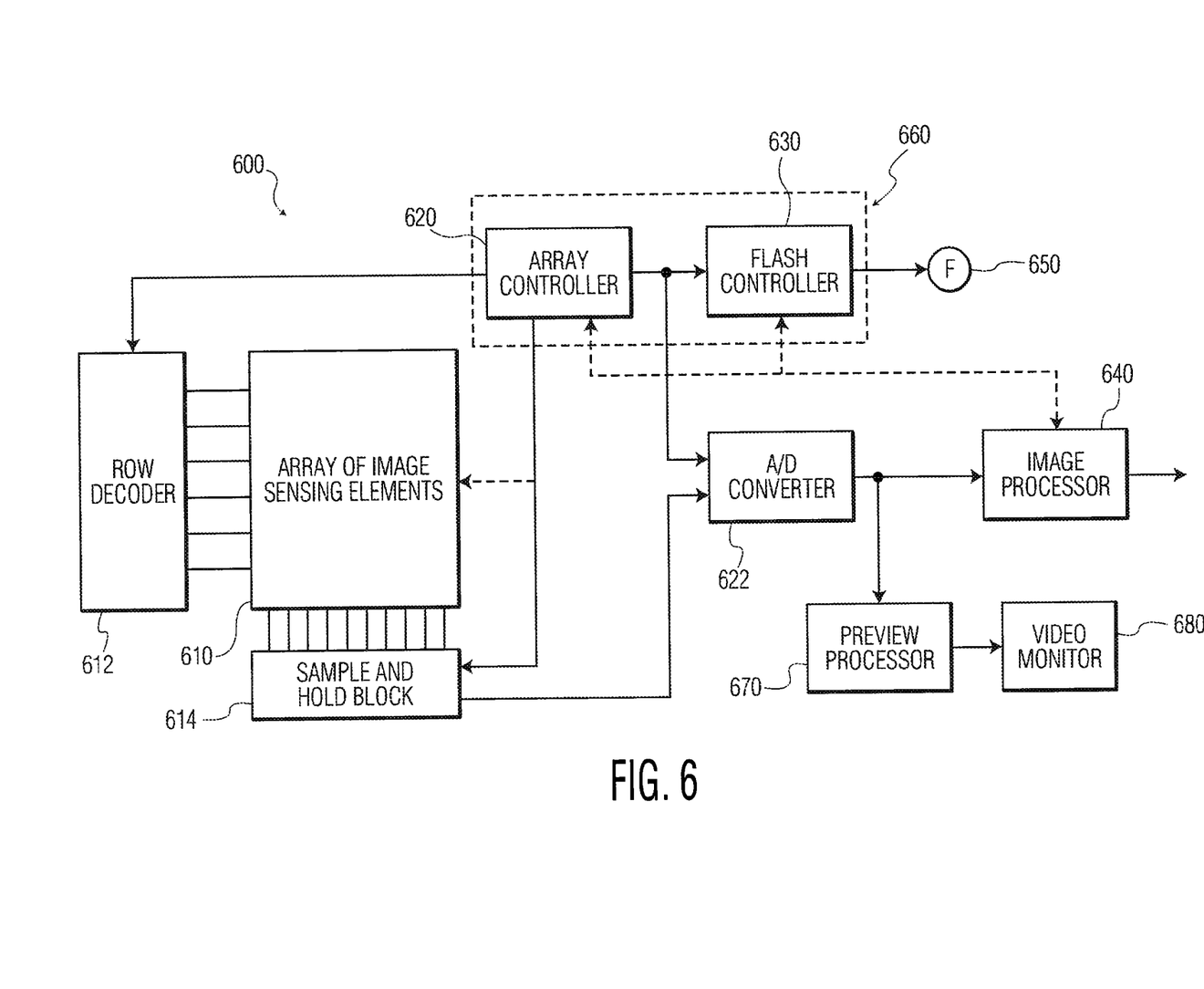
FIG. 6 illustrates a digital camera system, in accordance with an embodiment of the present invention.

Referring now to FIG. 6, there is illustrated a digital camera system 600, in accordance with an embodiment of the present invention. Digital camera system 600 includes an array of image sensing elements 610 (herein also referred to herein as "array 610"). In an embodiment, imager array 610 is an array of active pixel sensor (APS) pixels arranged as a plurality of rows and columns, each APS pixel including a photodiode. As described below, example digital camera system 600 is configured to implement middle curtain synchronization.

A lens (not illustrated) of digital camera system 600 focuses an image of a scene (not illustrated) onto array 610. Array 610 senses or captures the image, as described below, as pixel data. The captured image is referred to as a "frame." Frame 500 (shown in FIG. 5) is an example of a frame generated by system 600. Description below of the generation of a frame by system 600 is made with reference to frame 500.

Digital camera 600 also includes an array controller 620 and a flash controller 630 which may be embodied as separate ICs (620 and 630) or together in a single IC, e.g., as a part of a controller 660. Any description below with reference to either array controller 620 or flash controller 630 and their functionality applies to embodiments of digital camera system 600 that include controller 660. In such embodiments, controller 660 may perform the functions of array controller 620 and flash controller 630.

It is understood that the implementation of array controller 620 in digital camera 600 is not limited to any particular construction. Thus, embodiments in which array controller 620 is implemented using array control hardware or array circuitry are contemplated. In such embodiments, array controller 620 may be implemented as a special-purpose circuit using RTL logic. Additionally, embodiments in which array controller 620 is implemented in software running on a system microprocessor or microcontroller (not shown) are contemplated. The implementation of flash controller 630 is similarly flexible. Thus, flash controller 630 may be implemented in hardware, e.g., as flash control hardware, or in software, e.g., as a flash control driver or flash control firmware.

Array controller 620 is coupled to a row decoder 612 and a sample and hold circuit 614. Both row decoder 612 and sample and hold circuit 614 are coupled to the array of image sensing elements 610. By controlling row decoder 612 and sample and hold circuit 614, array controller 620 implements an electronic rolling shutter (ERS) to generate pixel data corresponding to at least a portion of an image focused on array 620. Using the ERS, array controller 620 provides an image frame formed from the pixel data.

To implement the ERS, array controller 620 sends messages to row decoder 612 to command row decoder 612 to sequentially reset rows of array 610. Array controller 620 also sends message to row decoder 612 and to sample and hold circuit 614 to sample sequential rows of image sensing elements of array 610, i.e., read out pixel data from sequential rows of array 610, at the end of the integration time for each of the lines.

Array controller 620 maintains a Reset pointer and a Read pointer that it uses to control the integration time of array 610 via row decoder 612 and sample and hold circuit 614. Viewed abstractly, array controller 620 scans the Reset and Read pointers through array 610 to reset and read the rows of array 610 respectively by row decoder 612 and sample and hold circuit 614. The Reset pointer indicates which row in array 610 is to be reset by row decoder 612, at any given time, and the Read pointer indicates which row in array 610 is to be read out by sample and hold circuit 614, at any given time.

The Reset pointer leads the Read pointer by a predetermined number of rows. After the Reset pointer resets a row in array 610, and after the Read pointer is advanced by the predetermined number of rows (the shutter width) to point to the reset row, the Read pointer causes the sampling (reading out) of the row. Thus, array controller 620 sequentially advances the Read and Reset pointers through array 610, line by line (row by row), to capture at least a portion of an image projected onto array 610 as a frame.

In a first embodiment, array controller 620 advances the Read and Reset pointers through every row in array 610 so as to capture the entire image projected (or focused) onto array 610 as a frame. For example, in such an embodiment, array controller 620 captures all of the image as frame 500 for processing.

In a second embodiment, array controller 620 advances the Read and Reset pointers through fewer than all of the rows of array 610 to capture only a portion of the image projected (or focused) onto array 610 as a frame, this portion being less than the entire image. Thus, array controller 620 may provide an image frame corresponding to a cropped image. For example, in such an embodiment, array controller 620 captures less than the entire image as frame portion 530 for processing.

In a third embodiment, array controller 620 advances the Read and Reset pointers through every other row in array 610, or every third row, every fourth row, etc. Thus, pixel data in every other row, every third row, every fourth row, etc. is generated as the frame for processing, the other rows being ignored.

Integration time is the amount of time an image sensing element in array 610 is exposed to an image between being reset responsive to the Reset pointer and being read responsive to the Read pointer. Generally speaking, the integration time is dependent upon two variables that are set by array controller 620: (1) the number of rows separating the Read and Reset pointers, i.e., the shutter width, and (2) the line-time, which is the amount of time the Read and Reset pointers point to their respective rows in array 610 prior to being advanced to subsequent rows in array 610. The product of the shutter width and the line-time equals the integration time.

The values of the image sensing elements of array 610 are sampled (read out) as analog values of pixel data that are converted to digital values by an A/D converter 622 which is also controlled by array controller 620. The digital values are provided to an image processor 640 for further processing. In an embodiment described below, image processor 640 implements, among other image processing functions, a digital zoom. As with flash controller 630, image processor 640 may be implemented in hardware or in software. In hardware, it may be implemented using special-purpose image processing hardware or an image driving circuit, and in software, it may be implemented using an image firmware driver running on the system microprocessor or microcontroller (not shown).

Figure 7:
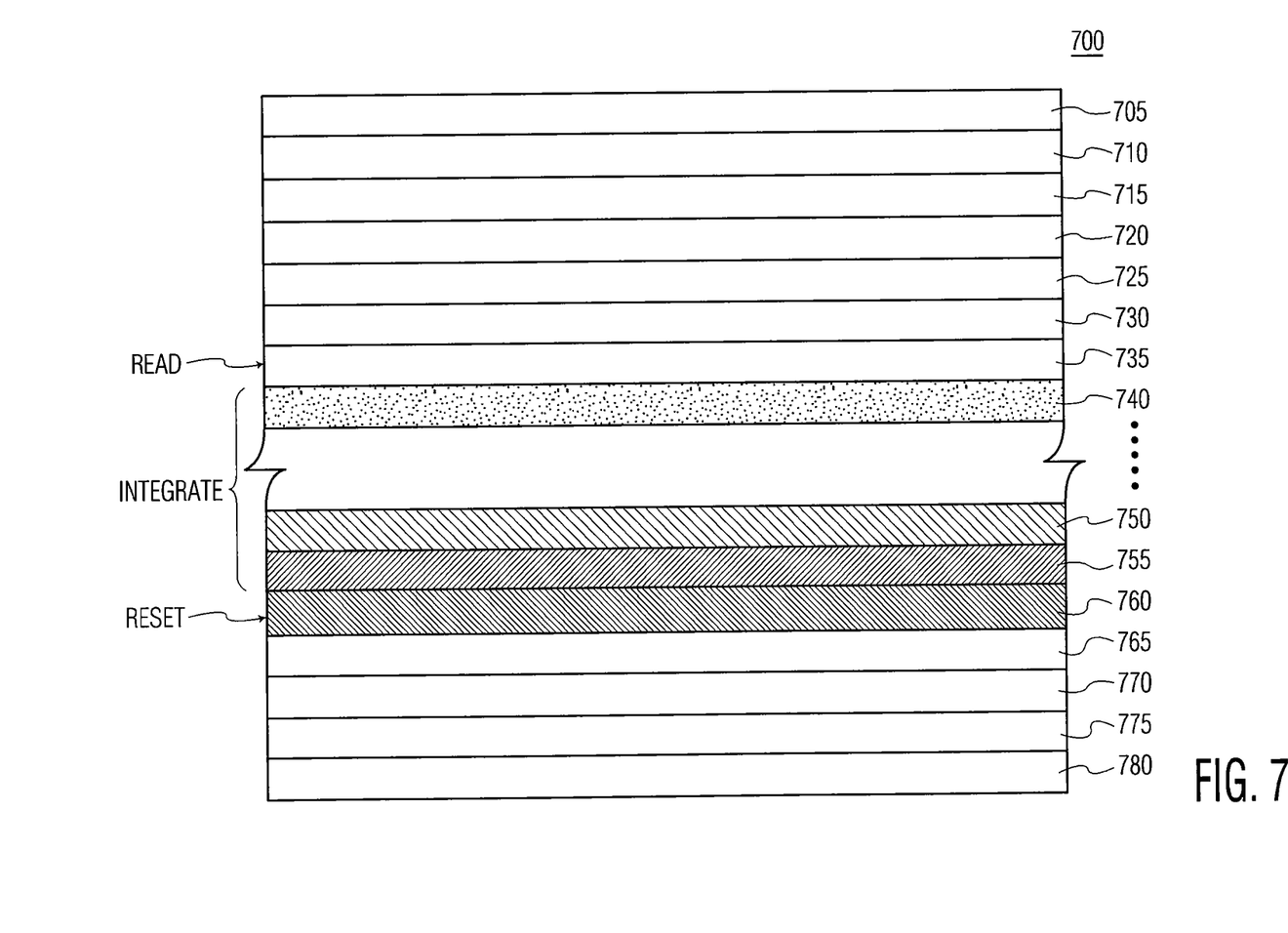
FIG. 7 illustrates an electronic rolling shutter implemented by the digital camera system illustrated in FIG. 6, in accordance with an embodiment of the present invention.

FIG. 7 shows an embodiment of the ERS implemented by array controller 620 for capturing an image sensed by array 610. FIG. 7 illustrates the ERS as an ERS 700. The various lines of array 610 are labeled as 705 through 780. The Reset pointer of ERS 700 is illustrated as pointing to line 760, and the Read pointer as pointing to line 735. The Reset pointer is offset from the Read pointer by N lines. Thus, the shutter width of ERS 700 is N lines, and the integration time of ERS 700 is equal to N times the line-time of the Reset or Read pointer. Array controller 620 controls ERS 700 by cycling the Reset and Read pointers through lines 705-780 of array 610 to generate pixel data for an image frame corresponding to the image projected onto array 610.

Referring again to FIG. 6, it is noted that in low light conditions, the image sensing elements in array 610 may be underexposed after integration. There are at least two possible solutions to this problem. In a first solution, the integration time of the image sensing elements may be increased. An image, or portions thereof, captured using such a technique may be blurred as the result of moving objects within the scene or camera jitter resulting from movement of the camera. Thus, increasing the integration time may result in a captured image not being as sharp as desired. This solution, therefore, may not be desirable.

In a second solution, a flash, such as a flash 650, which may be embodied as a pulsed flash such as an LED or Xe flash, may be used to increase the exposure of the image sensing elements to the image to be captured as the frame. To prevent overexposure (over saturation), the integration time may be reduced. Shorter integration times may also reduce image blur. Thus, the second solution may be desirable.

Reducing the integration time to allow for the use of flash may be accomplished by reducing the line-time of the longer of the Reset and Read operations, but the reduction in line-time is limited by how fast a row of pixels can be reset or by how fast sample and hold block 614 can read out the analog values of one row of array 610. Thus, if lowering the line-time does not yield a sufficiently small integration time, the number of rows between the Read and Reset pointers, i.e., the shutter width, may also (or alternatively) be reduced. The result, as described above, is that flash 650 may not illuminate all pixels in array 610 because some lines of pixels are not in their integration time when the flash is activated. The generated frame may, therefore, include underexposed portions.

With respect to frame 500, for example, in an example embodiment of the present invention using the second solution identified above, digital camera system 600 uses flash 650 to illuminate a scene to be imaged, resulting in only a portion of the frame 500 being properly exposed. More specifically, a portion (e.g., portions 510 and 520) of frame 500 corresponding to a first set of rows of array 610 is underexposed, but a portion (e.g., portion 530) corresponding to a second set of rows in the middle of array 610 is properly exposed.

As noted above, digital camera system 600 includes a flash controller 630. With regard to frame 500, flash controller 630 controls flash 650 to illuminate middle portion 530 of frame 500. More specifically, camera system 600, via flash controller 630, implements middle curtain synchronization to illuminate middle portion 530. In this context, "synchronization" refers to synchronizing flash 650 to one of the Read pointer and the Reset pointer resulting in middle portion 530 of frame 500 being illuminated.

To effect middle curtain synchronization, array controller 620 provides flash controller 630 with the positions of the Read and Reset pointers of the ERS. Flash controller 630 synchronizes flash 650 to operate (discharge) depending upon a position of either the Read pointer or the Reset pointer. In one embodiment, flash controller 630 synchronizes flash 650 to discharge when the Read pointer is at a row in array 610 previous to the second set of rows mentioned above, e.g., at a line of frame 500 immediately previous to portion 530 illustrated in FIG. 5. In other words, flash controller 630 synchronizes flash 650 to the leading curtain of middle portion 530 of frame 500. In another embodiment, flash controller 630 synchronizes flash 650 to discharge when the Reset pointer is at a row in array 610 following the second set of rows mentioned above, e.g., at a line of frame 500 immediately following portion 530. In other words, flash controller 630 synchronizes flash 650 to the trailing curtain of middle portion 530 of frame 500.

Figure 8:
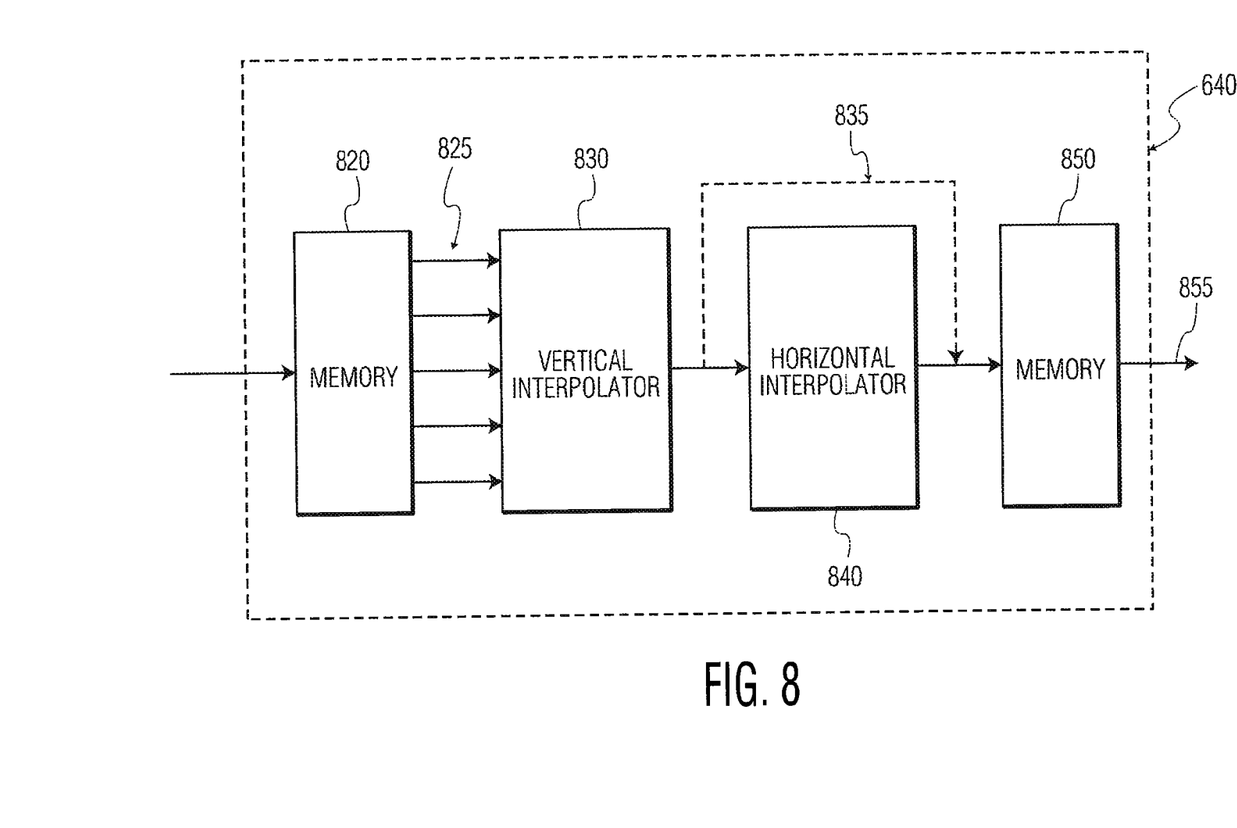
FIG. 8 illustrates an image processor of the camera system illustrated in FIG. 6, in accordance with an embodiment of the present invention.

FIG. 8 illustrates an embodiment of image processor 640 that digitally zooms and crops (when necessary or desirable) a frame provided by array 610 (captured by array controller 620). Image processor 640 includes a memory 820 which receives at least a portion of the frame provided by array 610 (captured by array controller 620) to ADC 622 (shown in FIG. 6), line by line, for storage therein. The frame provided by ADC 622 from array 610 (captured by array controller 620) may correspond to either an entire image projected onto array 610, in which case the frame corresponds to an image not cropped by array 610 or array controller 620, or a portion of an image projected onto array 610, in which case the frame corresponds to an image cropped by array 610 or array controller 620. It is contemplated that image processor 640 may crop or further crop the frame received and stored in memory 820 by reading out and processing fewer than all lines of the frame stored in memory 820 in the interpolations described below.

From memory 820, lines of the frame are passed to a vertical interpolator 830 where they are interpolated in a vertical direction (dimension). The lines of the image are vertically interpolated to produce a number of lines substantially equal to the number of lines in a desired output image frame. The vertically interpolated lines are then passed to a horizontal interpolator 840, one-by-one, where they are interpolated in a horizontal direction (dimension). In one embodiment of image processor 640, the vertical and horizontal interpolations maintain the aspect ratio of the frame produced by imager 610 or read out from memory 820. Other embodiments in which the vertical and horizontal interpolations change the aspect ratio are contemplated. After interpolation by interpolators 830 and 840, the interpolated lines are then provided to a memory 850 where they are stored as a digitally enlarged (zoomed) image frame. The digitally enlarged image is available for export via output line 855 for storage or further processing.

In an example embodiment, vertical interpolator 830 effects four-line interpolation. Thus, memory 820 provides a first set of four lines of the frame stored within memory 820 to vertical interpolator 830, and vertical interpolator 830 generates a first interpolated line which is then passed to horizontal interpolator 840 for horizontal interpolation. As the number of lines in the digitally zoomed frame may be greater than the number of lines in the frame stored in memory 820, vertical interpolator 830 may generate more than one output line for each set of four input lines. Vertical interpolator 830 uses different sets of coefficients for the two lines, resulting in lines having two different positions in the output image. Vertical interpolation then continues with a second set of four lines of the frame stored within memory 820 to produce a next interpolated line. Interpolation is completed for all sets of four adjacent lines of the captured frame.

It is contemplated that the first and second sets of four rows include overlap. For example, the first set of four rows may be lines 1-4 of the frame stored in memory 820, and the second set of four rows may be lines 2-5 of the stored frame. It should be noted that other embodiments that perform other orders of interpolation, such as two-line interpolation, in vertical interpolator 830 are contemplated.

Discussion of image processor 640 is now made with reference to frame 500 and portions thereof Three example embodiments are described above by which image frames are provided by array 610 (captured by array controller 620). In the first embodiment, all lines of array 610 corresponding to the entire captured image are read out as a frame of pixel data. An example is frame 500. In the second embodiment, portions of array 610, i.e., fewer than all rows of array 610, corresponding to a portion of the entire image projected onto array 610 are read out as a frame. An example is frame portion 530. In the third embodiment, every other row, or every third row, every fourth row, etc. in array 610 are read out as a frame.

For the first two embodiments, the read-out frames are communicated to image processor 640 where they are stored into memory 820. In the first embodiment in which frame 500 is captured and communicated to image processor 640, only portion 530 may be read from memory 820 for further processing by image processor 640. Hence, image processor 640 crops frame 500 down to portion 530. It is understood that frame 500 may be cropped in other ways, for example by reading out only portion 550 from memory 820, if it is desired that the resulting cropped frame 550 have the same aspect ratio as frame 500. (In the embodiment illustrated in FIG. 5, frame 500 and portion 550, i.e., cropped frame 550, have identical aspect ratios.) Thus, cropping in the first embodiment by selectively reading out image data from memory 820 eliminates underexposed portions of frame 500 and, optionally, achieves a desired aspect ratio. It is contemplated that memory 820 may be used to crop down portion 530 to provide a frame with an aspect ratio other than that of frame portion 550.

In the second embodiment in which frame 530 is captured (such as when the lines of array 610 corresponding to frame 530 are read out, the remaining lines of array 610 being ignored) and communicated to image processor 640, portion 550 may be read out from memory 820 for further processing by image processor 640. Hence, image processor 640 crops frame 530 down to portion 550. It is contemplated that memory 820 may be used to crop down portion 530 to provide a frame with an aspect ratio other than that of frame 550. Thus, cropping in the second embodiment achieves a desired aspect ratio. It is also contemplated that memory 820 may not further crop frame portion 530. Thus, image processor 640 may process frame portion 530.

The frames or cropped frames, e.g., frame 550, are provided to vertical interpolator 830 for vertical interpolation. The interpolated lines produced by vertical interpolator 830 are provided to horizontal interpolator 840 for horizontal interpolation. The resulting interpolated lines are fed to memory 850, where they are stored. Together, vertical and horizontal interpolators 830 and 840 effect a digital zoom to expand the resolution of the cropped frames (e.g., frame 550). Because the underexposed portions of frame 500 are eliminated, the resulting cropped, zoomed images are entirely properly exposed.

For the third embodiment mentioned above, image processor 640 may process the captured frame provided by array 610 without needing to crop the frame or horizontally interpolate lines of the frame. In this embodiment, both the Reset pointer and the Read pointer advance by skipping over at least one row in the imager array 610. Thus, the entire imager may be scanned in a shorter time providing a reduction in integration time. When every other row, every third row, etc. of array 610 is read out to produce the frame, it is possible for there to be no need for cropping the frame, as long as the aspect ratio (which can be restored, as described below) represented in frame 500 is acceptable. In one scenario, the frame is stored in memory 820; memory 820 feeds lines of the frame stored therein to vertical interpolator 830; and vertical interpolator 830 interpolates the lines of the frame to produce a number of lines sufficient to restore the aspect ratio of the frame to that of frame 500. In that scenario, no horizontal interpolation is required, and horizontal interpolator 840 is bypassed by line 835 so that vertical interpolator 830 feeds interpolated lines directly to memory 850 for storage therein. Thus, image processor 640 may process the frame without needing to crop the frame received from array 610. It is contemplated, however, that the received frame may be cropped and interpolated using the methods heretofore described.

Embodiments are contemplated in which the digital zoom implemented by image processor 640, specifically by vertical and horizontal interpolators 830 and 840, includes a degree of user control. In one embodiment, the user may set a level of magnification for the digital zoom when flash 650 is used. Because image processor 640 crops frames to remove underexposed areas, image processor 640 allows the user to select a digital zoom based upon the cropped frame. The user selection of the zoom level may control how many interpolated lines are produced by the vertical interpolator 830.

It is appreciated that as the user increases the desired level of digital zoom, the portion of frame 500 that requires illumination may shrink to an area of frame 500 smaller than portion 530. In the embodiment in which flash controller controls flash 650 depending on the position of the Reset pointer, it is desirable for the flash controller 630 to synchronize the flash to the Reset pointer when it reaches the end of the portion of frame 500 corresponding to the level of digital zoom selected by the user. In the embodiment in which flash controller controls flash 650 depending on the position of the Read pointer, flash controller 630 is controlled by the array controller 630 to discharge flash 650 when the Read pointer reaches the beginning of the portion of frame 500 corresponding to the level of digital zoom selected by the user. Thus, as can be seen in these embodiments, the level of the digital zoom selected by the user may drive flash controller 630.

The flash controller 630 may also control the image processor 640 and the array controller 620 to automatically produce a digitally zoomed image having a reduced integration time. Flash controller 630 may, for example, be coupled to a photo-sensor (not shown) to measure the ambient light. When the ambient light is less than a threshold, flash controller 630 may automatically activate flash 650. A signal indicating that flash 650 has been activated is provided to the array controller 620, causing it to shorten the integration time of the imager, and to the image processor 640, causing it to digitally zoom the resulting image. In this embodiment, the timing of flash 650 may still be determined by the array controller 620, based on the row number of the Reset or Read pointer, as described above.

Alternatively, the ambient light may be measured by image processor 640 based on an image captured by the image sensing array 610 without flash. The processor 640 may, for example, calculate a histogram of this captured image and, from the histogram, determine either a maximum illumination level or a median illumination level. If this determined level is less than a threshold value, camera 600 may activate flash 650.

Referring again to FIG. 6, digital camera system 600 further includes a monitor 680 on which a preview of a sensed image is displayed. In embodiments of digital camera system 600, previews of sensed images are generated without operation of flash 650. In other embodiments, illuminated portions of frames, such as portion 530 or 550, may be presented as previews.

Monitor 680 provides previews of sensed images on a real-time basis so that an operator of digital camera system 600 may see how a frame to be generated will appear. As described below, the monitor may show the portion of the image that would be captured if flash 650 were activated. Array 610 generates a frame (referred to herein as a "preview frame"), such as frame 500, corresponding to all of array 610 using methods previously described and provides the frame to a preview processor 670. Flash 650, however, is not used. Preview processor 670 combines (bins) adjacent pixels provided by the imager to generate the preview frame for presentation on monitor 680. Binning reduces the resolution of the preview frame but also results in it appearing brighter than a full-sized frame captured without flash would appear. It is contemplated that preview processor 670 or video monitor 680 may output the preview frame for storage or further processing elsewhere. Preview processor 670 may, for example, generate a video signal which may be recorded on a memory device coupled to camera 600. While the binning of adjacent pixels is described as being performed in the digital domain by preview processor 670, it is contemplated that it may be performed in the analog domain by imager array 610 in response to signals provided by array controller 620. Imager array 610 may bin adjacent pixels, for example, by transferring the charges accumulated on the photodiodes of the adjacent pixels to a common node.

In an example embodiment, preview processor 670 adds to the binned preview frame a boxed outline around a middle region of the preview frame. This boxed outline is an estimate of what portion of a full-sized frame, such as frame 500, would be illuminated if it were to be captured by array 610 in conjunction with flash 650. The boxed outline allows an operator of digital camera system 600 to move array 610, i.e., a camera that includes array 610, and determine, by looking at where the box in the preview frame lies, that an object of interest will fall within a middle, illuminated portion of the frame that will be captured when the flash is activated.

It is contemplated that in some embodiments of digital camera system 600, the user may select which portion of the captured frame is to be illuminated and, therefore, provided as the cropped, digitally zoomed output frame. In such embodiments, the box displayed on video monitor 680 is movable by the user so that he or she may select the portion to be illuminated. The user may enter such a selection by navigation buttons, a touch screen, etc., which communicate the selection to array controller 620. Array controller 620 communicates the selection to flash controller 630 so that flash controller 630 is able to drive flash 650 to illuminate the user-selected portion of the frame captured by array 610. The illuminated portion of the capture frame is processed in image processor 640 using the techniques described above. As with the embodiments of middle curtain synchronization described above, flash controller 630 may synchronize flash 650 depending upon the Reset pointer's position relative to the user-selected portion of the frame or the Read pointer's position relative to the user-selected portion of the frame. Array controller 620 also controls memory 820 (shown in FIG. 8) to provide the appropriate rows of pixels to vertical interpolator 830.

Figure 9:
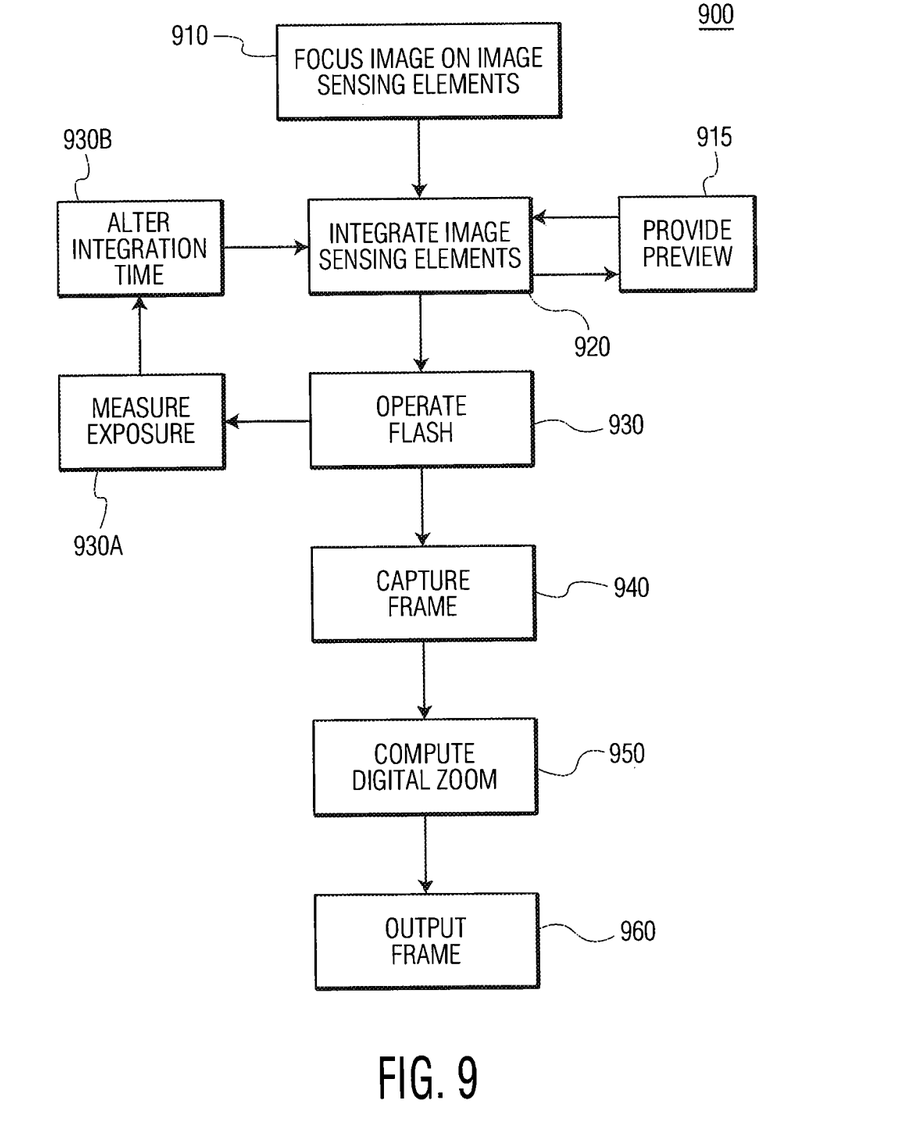
FIG. 9 illustrates a method of synchronizing a flash to a middle portion of a frame, in accordance with an embodiment of the present invention.

Referring now to FIG. 9, there is illustrated a method 900 for capturing an image using a flash. Description of method 900 is made with reference to digital camera system 600. Thus, method 900 is a method for capturing an image as a frame, such as frame 500, using system 600.

Method 900 begins with a step 910 of focusing an image of a scene onto array 610. Processing continues to a step 920, in which array controller 620 operates the ERS described above to expose array 610 to the image. More specifically, in step 920, array controller 620 begins advancing the Reset pointer of the ERS through array 610, line by line. Because a flash is being used, the controller 620 has shortened the integration time for each row of the imager by reducing the number of lines between the Reset pointer and the Read pointer.

In a step 930, flash controller commands flash 650 to discharge to illuminate the scene for which the image is to be captured as a frame. Because the image is captured using an ERS, only a portion of the image that is in its integration time when the flash is activated will appear fully illuminated when captured. Thus, in step 930, flash controller 630 synchronizes flash 650 to a middle of the frame to be captured in step 940.

In a step 940, array controller 620 commands array 610 to capture an image of the scene. More, specifically, in step 940, array controller 620 advances the Read pointer of the ERS through array 610, line by line, to capture the image sensed by array 610 as a frame. An example of a captured frame, is frame 500 or a portion thereof, e.g., frame 530, illustrated in FIG. 5.

In a step 950, the captured image, or a portion thereof, is converted by A/D converter 622 and provided to image processor 640, where it is cropped and digitally zoomed, as described above with respect to FIG. 6. In a step 960, the cropped, digitally zoomed image is output for storage or further processing.

In an example embodiment, method 900 includes additional steps 930A and 930B that are executed as part of a test-flash routine. In the test flash routine, in step 930, flash controller 630 commands flash 650 to discharge a test flash to illuminate the scene for which an image is to be captured. In step 930A, array controller 620 or image processor 640 measures an exposure of array 610 to the test flash. If the exposure is too low, in step 930B, array controller 620 increases the shutter width of the ERS. If the exposure is too high, in step 930B, array controller 620 decreases the shutter width. Processing continues to step 920 to implement another test flash or to capture a frame using the adjusted shutter width and an adjusted integration time based on the adjusted shutter width.

In another embodiment of method 900, step 910 further includes measuring an ambient light level, for example using a photosensor (not shown), and then estimating an integration time based on the measured ambient light level and a known light level of flash 650. The estimated integration time is intended to provide for proper exposure of array 610 to the image to be captured in step 940.

In yet another embodiment of method 900, method 900 includes a step 915 of providing a preview. In step 915, array controller 620 directs array 610 to capture an image of a scene as a preview frame without using flash. The preview frame is processed in preview processor 670, as described above, to provide a preview for display on video monitor 680.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A digital imager comprising:
an array of image sensing elements, which captures an image by integrating photo-charges during an integration time, wherein the array comprises a plurality of rows;
a light emitting diode;
a flash controller which activates the light emitting diode to produce a single flash synchronous with a read pointer that is adjusted in response to any of a plurality of user selected adjustable portions of the array performing integration during the integration time;
an array controller coupled to the flash controller, wherein the array controller is configured to control the array to capture, as pixel data, a portion of the image sensed by a selected one of the plurality of user selected adjustable portions of the array corresponding to a set of rows of the plurality of rows when the flash controller activates the light emitting diode to produce the single flash, wherein the array controller maintains the read pointer and a reset pointer, the read pointer indicates a row in the array being read, the reset pointer indicates a row in the array being reset, the array controller advances the read and reset pointers through the array to capture the image, the integration time is defined by a product of a distance between the read and reset pointers and an amount of time that the read and reset pointers point to a row in the array, the array controller reduces the integration time by reducing the amount of time that the read and reset pointers point to a row in the array, the flash controller activates the light emitting diode based on the position of the read pointer, and the flash controller controls the light emitting diode to begin to discharge when the read pointer is at a row immediately previous to the set of rows; and
processing circuitry coupled to one of the array controller and the flash controller, the processing circuitry interpolating an image frame from the pixel data corresponding to the selected one of the user selected adjustable portions of the array.

2. The digital imager of claim 1, wherein the selected one of the plurality of user selected adjustable portions of the array is a middle portion of the array and the processing circuitry implements a digital zoom to interpolate the image frame from the pixel data corresponding to the middle portion of the array.

3. The digital imager of claim 1, wherein the selected one of the plurality of user selected adjustable portions of the array is selected by a user of the digital imager.

4. An imaging system comprising:
a xenon flash;
an array of image sensing elements which senses an image of a scene, wherein the array comprises a plurality of rows;
a lens which focuses the image on the array of image sensing elements;
a controller which controls the array of image sensing elements to implement an electronic rolling shutter to capture the focused image, the electronic rolling shutter defining an integration time for each sensing element in the array, and which controls the xenon flash to produce a single flash to illuminate the scene synchronous with a read pointer that is adjusted in response to any of a plurality of user selected adjustable portions of the array corresponding to a set of rows of the plurality of rows performing integration during the integration time to capture a portion of the focused image, wherein the controller activates the xenon flash based on a position of the read pointer, and the controller controls the xenon flash to begin to discharge when the read pointer is at a row immediately previous to the set of rows; and
processing circuitry coupled to the controller, the processing circuitry providing image pixels representing the portion of the focused image responsive to the single flash, wherein the controller maintains the read pointer and a reset pointer, the read pointer indicates a row in the array being read, the reset pointer indicates a row in the array being reset, the controller advances the read and reset pointers through the array to capture the image, and the controller reduces the integration time by reducing the number of rows between the read and reset pointers.

5. The imaging system of claim 4, wherein the processing circuitry further provides a digital zoom feature for isolating and expanding at least the portion of the focused image.

6. The imaging system of claim 5, wherein the digital zoom feature comprises:
an image cropper which crops the portion of the focused image;
a vertical interpolator which interpolates pixel data representing the cropped portion of the focused image in a vertical dimension to provide vertically interpolated data;
and a horizontal interpolator which interpolates the vertically interpolated data in a horizontal dimension.

7. The imaging system of claim 6, wherein the interpolation performed by the vertical and horizontal interpolators depends upon a zoom level selected by a user of the imaging system.

8. The imaging system of claim 4, further comprising a memory, wherein the controller is configured to store at least the image pixels representing the portion of the focused image.

9. A method of capturing an image of a scene comprising:
sensing an image using an array of image sensing elements arranged in a plurality of rows and scanning the array to provide pixel data representing the image;
activating a light emitting diode to produce a single flash, synchronous with an adjustable reset pointer that is adjusted in response to any of a plurality of user selected adjustable portions of the array corresponding to a set of rows of the plurality of rows capturing a portion of the image during an integration time, wherein at least a further portion of the array of image sensing elements is not sensing the image when the single flash is produced, activating the light emitting diode is performed based on a position of the adjustable reset pointer, and the light emitting diode is activated when the adjustable reset pointer is at a row immediately following the set of rows;
providing frame data from the pixel data representing the sensed image, the frame data corresponding to a selected one of the plurality of user selected adjustable portions of the array, exclusive of the further portion of the image sensing array;
outputting the provided frame data;
maintaining a read pointer and the adjustable reset pointer, the read pointer indicating a row in the array to be read, the adjustable reset pointer indicating a row in the array to be reset, and the read pointer trailing the adjustable reset pointer by a number of rows which define the integration time; and
advancing the read pointer through the middle portion of the array to sense the image, after the adjustable reset pointer has reset a last row in the middle portion of the array.

10. The method of claim 9, wherein the providing of the frame data from the pixel data further includes computing a digital zoom on the frame data to provide a zoomed image.

11. The method of claim 9, further comprising establishing an integration time for rows of the array, wherein:
the selected one of the plurality of user selected adjustable portions of the array is a middle portion of the array; and
the sensing of the image comprises:
exposing each row of the middle portion of the array to the scene for the integration time, and
reading out pixel data from the exposed rows of the middle portion of the array after each row of the middle portion is exposed to the portion of the image for the integration time.

12. The method of claim 11, wherein the establishing of the integration time comprises changing a number of rows between the read pointer and the adjustable reset pointer.

13. The method of claim 9, further comprising establishing an integration time for rows of the array, wherein:
the sensing of the image comprises:
exposing each of a plurality of rows of the array to the scene for an amount of time equal to the integration time, and
reading out pixel data from selected ones of the exposed plurality of rows each selected row being separated from a next selected row by at least one unselected row.

14. The method of claim 13, wherein the providing of the frame data comprises interpolating the frame data to provide interpolated lines corresponding in position in the image to the unselected rows in the array of image sensing elements.

15. A method of controlling an imaging system, comprising:
focusing an image of a scene on an array of image sensing elements arranged in a plurality of rows;
controlling an electronic rolling shutter to capture the image as a frame;
synchronizing a discharge of a xenon flash to produce a single flash synchronous with an adjustable reset pointer that is adjusted in response to any of a plurality of user selected adjustable portions of the array corresponding to a set of rows of the plurality of rows capturing a portion of the image during an integration time, wherein a further unselected portion of the array is not capturing the image when the xenon flash is discharged, synchronizing the discharge of the xenon flash is performed based on a position of the adjustable reset pointer, and the xenon flash begins to discharge when the adjustable reset pointer is at a row immediately following the set of rows;
maintaining a read pointer and the adjustable reset pointer, the read pointer indicating a row in the array to be read, the adjustable reset pointer indicating a row in the array to be reset, and the read pointer trailing the adjustable reset pointer by a number of rows which define the integration time; and
advancing the read pointer through the set of rows to sense the image, after the adjustable reset pointer has reset a last row in the set of rows.

16. The method of claim 15, further comprising:
binning signals provided by adjacent image sensing elements of the array when the xenon flash is not activated; and
presenting the binned pixels for display as a preview of the image.

17. The method of claim 16, further including identifying, in the preview, a portion of the image corresponding to a selected one of the plurality of user selected portions of the array.

18. The method of claim 15, further comprising:
establishing an initial integration time for the array of image sensing elements;
while exposing each row of the array of image sensing elements corresponding to a selected one of the user selected portions of the array for an amount of time equal to the initial integration time, discharging a test flash to generate a test frame;
analyzing the test frame to determine whether the selected one of the user selected adjustable portions of the array of image sensing elements has been adequately exposed; and
adjusting the integration time to provide for adequate exposure of the array of image sensing elements, wherein the controlling of the electronic rolling shutter to capture the image comprises exposing the each row of the array of image sensing elements corresponding to the selected one of the user selected adjustable portions of the array for an amount of time equal to the adjusted integration time.

19. The method of claim 15,
wherein a selected one of the plurality of user selected adjustable portions of the array of image sensing elements is a middle portion of the array and the method further comprises:
isolating pixel signals from the middle portion of the array when the xenon flash is not activated; and
presenting the isolated pixels for display as a preview.

* * * * *